United States Patent [19]

Malachowski

[11] 4,079,876

[45] Mar. 21, 1978

[54] COMPUTER FORMS FEEDER

[75] Inventor: Michael A. Malachowski, Rochester, N.Y.

[73] Assignee: Xerox Corporation, Stamford, Conn.

[21] Appl. No.: 782,684

[22] Filed: Mar. 30, 1977

[51] Int. Cl.² .............................................. G03B 1/30
[52] U.S. Cl. ......................................... 226/75; 226/87
[58] Field of Search ...................... 226/74, 75, 79, 87; 352/183; 355/75

[56] References Cited

U.S. PATENT DOCUMENTS

| 2,179,155 | 11/1939 | Mabon | 226/75 |
| 3,090,299 | 5/1963 | Comstock | 226/79 X |
| 4,010,882 | 3/1977 | Turner | 226/75 X |

Primary Examiner—Richard A. Schacher

[57] ABSTRACT

A document feeder capable of handling continuous length document materials such as computer fanfold, the feeder having spaced belts with angled projections thereon adapted to engage perforations in the document material to cause the document material to ride up on the projections during a feed cycle to lift the document material from the copy platen of the machine and prevent scrubbing of the document thereon.

3 Claims, 5 Drawing Figures

COMPUTER FORMS FEEDER

BACKGROUND OF THE INVENTION

With the advent of high speed copying machines, the desirability of reproducing continuous sheets of computer fanfold material onto 8½ × 11 inch sized sheets which could be more readily utilized in bound booklets or loose leaf notebooks was recognized. To accomplish this, it has been the practice to rapidly slew the continuous fanfold across the copy platen of a copy machine, momentarily stopping the movement of the fanfold for exposing the individual page thereof and then rapidly slewing the fanfold to the next sheet to enable rapid reproduction and continuous operation of the copy machine. However, due to the rapid movement of the sheets between exposures to maximize machine output, a great deal of "scrubbing" between the fanfold material and the copy platen of the machine is experienced. This is particularly true in copying machines utilizing a curved copy platen.

It is therefore an object of the present invention to provide a continuous document feeder particularly adapted to raise the continuous document from the surface of the platen during slewing or advancement thereof to prevent contact with the copy platen until the document feeder has stopped to enable exposure of an individual page thereon.

SUMMARY OF THE INVENTION

A document handling apparatus for moving edge perforated document material across the exposure platen of a reproduction machine comprising a pair of movable feed belts disposed adjacent opposite sides of the exposure platen, the belts having a plurality of angled projections thereon formed of a low friction material for mating engagement with the perforations in perforated document material, movement of the belts causing the document material to slide up the angled projections on the belts to lift the material from the exposure platen, biasing means being provided for cooperation with the feed belts to force the document material into contact with the exposure platen when the feed belts are stopped to enable exposure of the document material.

DESCRIPTION OF THE PREFERRED EMBODIMENT

Figure 1:
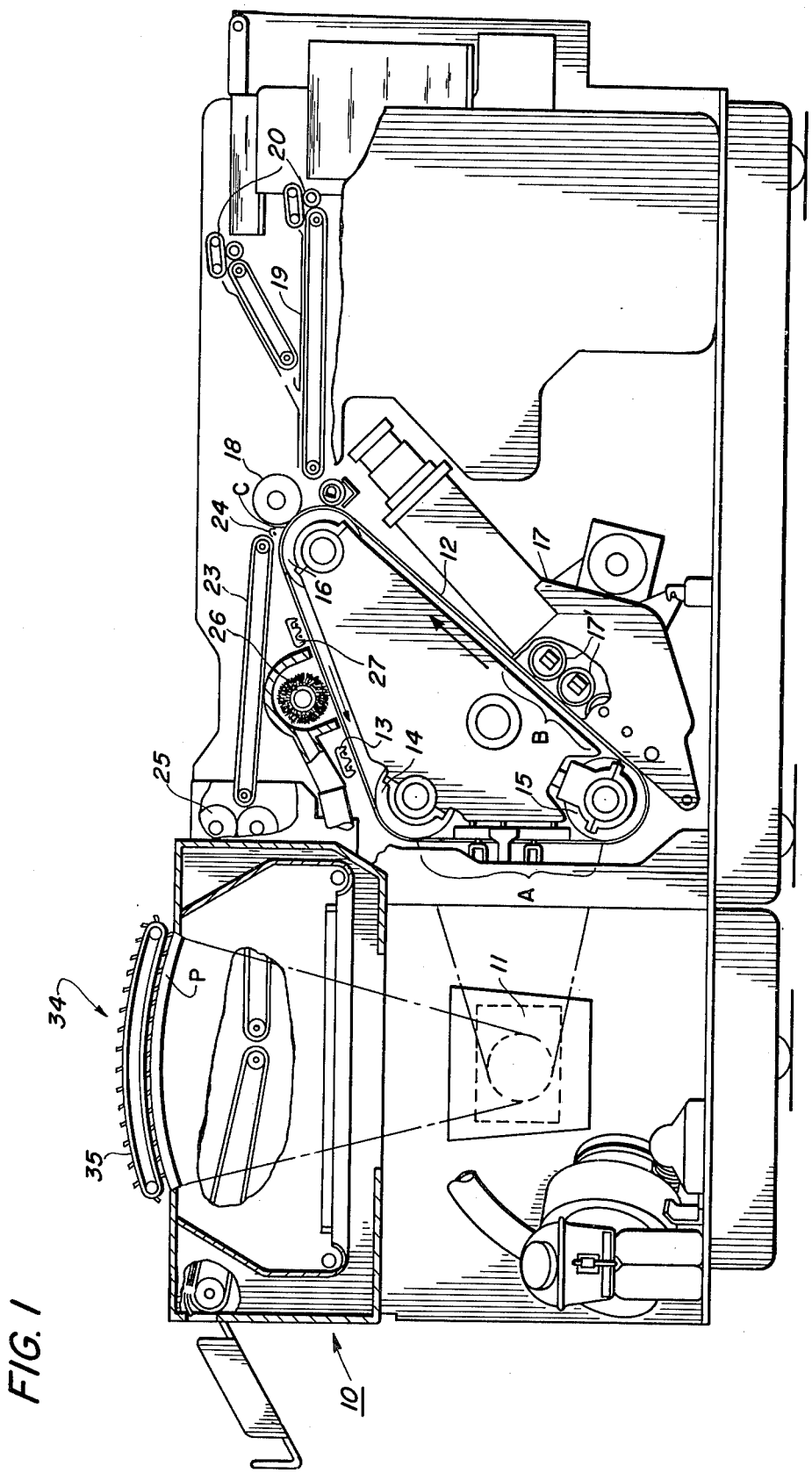
FIG. 1 is a schematic representation of a copying machine incorporating the improved document feeder of the present invention.
Figure 2:
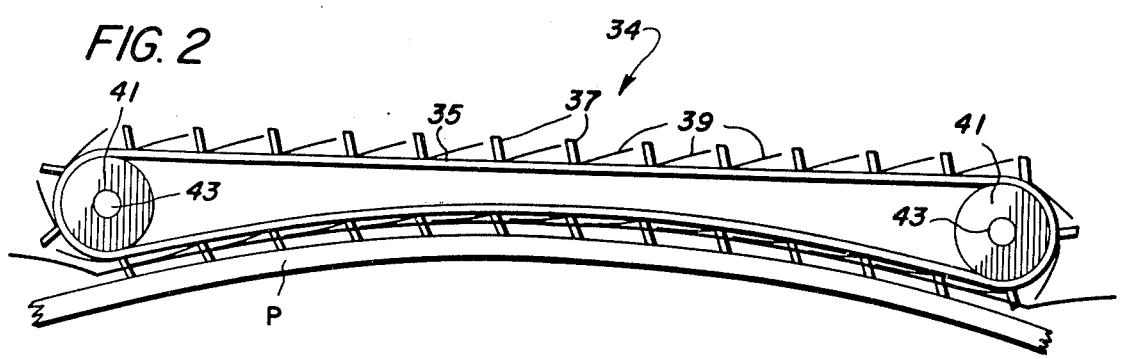
FIG. 2 is a side view in section showing the platen area of the machine with the document belt thereover.

For a general understanding of an electrostatic processing system in which the invention may be incorporated, reference is had to FIG. 1. In the illustrated machine, an original to be copied is placed upon a transparent support platen P fixedly arranged in an illumination assembly generally indicated by the reference numeral 10. While upon the platen, the illumination system flashes light rays upon the original thereby producing image rays corresponding to the informational areas on the original. The image rays are projected by means of an optical system 11 to an exposure station A for exposing the photosensitive surface of a moving xerographic plate in the form of a flexible photoconductive belt 12. In moving in the direction indicated by the arrow, prior to reaching the exposure station A, that portion of the belt being exposed would have been uniformly charged by a corona device 13 located at a belt run extending between belt supporting rollers 14 and 16. The exposure station extends between the roller 14 and a third support roller 15.

The exposure of the belt surface to the light image discharges the photoconductive layer in the areas struck by light, whereby there remains on the belt a latent electrostatic image in image configuration corresponding to the light image projected from the original on the supporting platen. As the belt surface continues its movement, the electrostatic image passes around the roller 15 and through a developing station B located at a third run of the belt wherein there is positioned a developing apparatus generally indicated by the reference numeral 17. The developing apparatus 17 comprises a plurality of brushes 17' which carry developing material to the adjacent surface of the upwardly moving inclined photoconductive belt 12 in order to provide development of the electrostatic image.

The developed electrostatic image is transported by the belt 12 to a transfer station C located at a point of tangency on the belt as it moves around the roller 16 whereat a sheet of copy paper is moved at a speed in synchronism with the moving belt in order to accomplish transfer of the developed image. There is provided at this station a transfer roller 18 which is arranged on the frame of the machine for contacting the nontransfer side of each sheet of copy paper as the same is brought into transfer engagement with the belt 12. The roller 18 is electrically biased with sufficient voltage so that a developed image on the belt 12 may be electrostatically transferred to the adjacent side of a sheet of paper as the same is brought into contact therewith. There is also provided a suitable sheet transport mechanism 19 adapted to transport sheets of paper seriatim from a paper handling mechanism generally indicated by the reference numeral 20 to the developed image on the belt as the same is carried around the roller 16. A programming device operatively connected to the mechanism 20 and the illumination device for producing an electrostatic latent image on the belt 12, is effective to present a developed image at the transfer station C in time sequence with the arrival of a sheet of paper.

The sheet is stripped from the belt 12 after transfer of the image thereto by a stripper transport 23 and a detack corona emission device 24, and thereafter conveyed by the stripper transport 23 into a fuser assembly generally indicated by the reference numeral 25 wherein the developed and transferred xerographic powder image on the sheet is permanently affixed thereto. After fusing, the finished copy is discharged from the apparatus at a suitable point for collection externally of the apparatus. The toner particles remaining as residue on the developed image, background particles, and those particles otherwise not transferred are carried by the belt 12 to a cleaning apparatus positioned on the run of the belt between rollers 14 and 16 adjacent the charging device 13. The cleaning device, comprising a rotating brush 26 and a corona emission device 27 for neutralizing charges remaining on the particles, is connected to a vacuum source (not shown) for removing the neutralized toner particles from the belt prior to the formation of subsequent images thereon.

The reproduction machine is adapted to copy either single page documents or continuous or web-type documents such as computer fanfold. To accommodate this latter type of document, the reproduction machine includes, adjacent one side of platen P, a form or web feeder 34 having a pair of endless feed belts 35 cooperable with edge perforations 36 in the fanfold material to draw the fanfold material across the platen. Feed belts 35 are intermittently driven to draw the computer fanfold across the platen in increments corresponding to a page, copying thereof being effected while drive to feed belts is interruped and the fanfold stationary.

As seen in FIG. 1, the copying machine platen is arcuate, single page documents or the portion of fanfold then being copied resting thereupon during the copying cycle. Other platen shapes, i.e., flat, may be readily envisioned.

Figure 3:
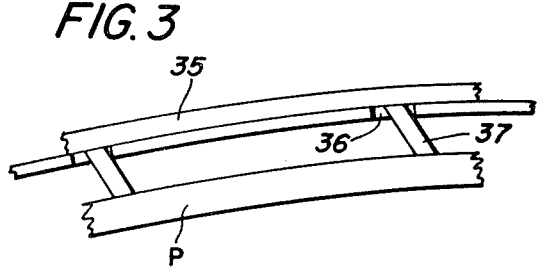
FIG. 3 is an enlarged sectional view showing the position of the continuous form document relative to the feed belt during a feed cycle.
Figure 4:
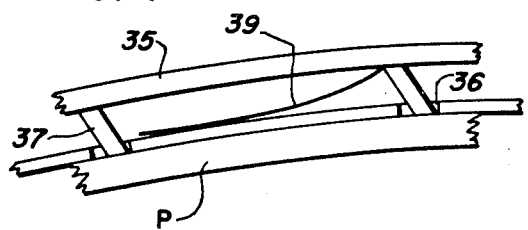
FIG. 4 is an enlarged sectional view showing the position of the continuous form document relative to the document feed belt upon stoppage of the feeder to allow exposure of the form.
Figure 5:
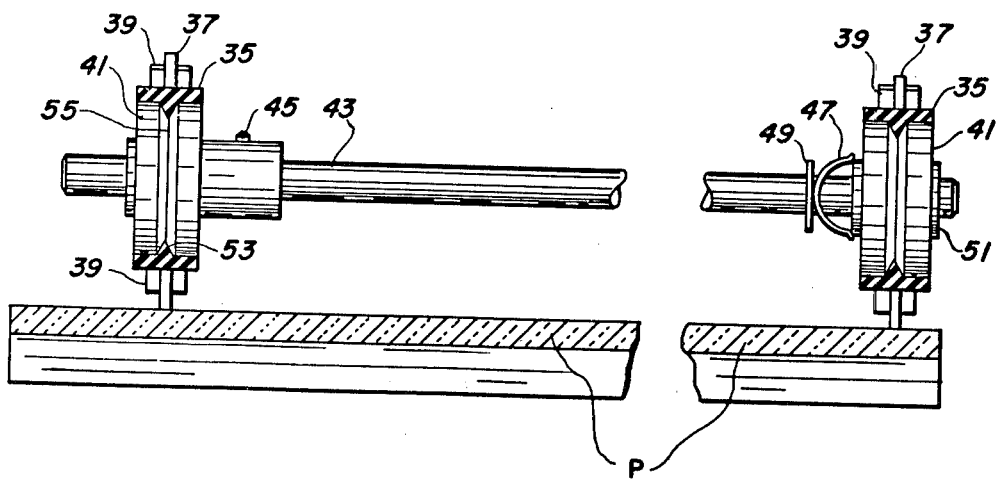
FIG. 5 is an end view of the feed rolls at one end of the document feeder illustrating the mounting thereof and the positioning of the feed belts thereon.

Referring to FIGS. 2-5 wherein the feed belt is more clearly illustrated, it can be seen that each feed belt 35 is provided with a plurality of projections 37 adapted to mate with perforations in the fanfold material. The projections 37 are formed of a hard material such as plastic and project from the body of the feed belt 35 at an angle for reasons to be hereinafter explained. A plurality of lightweight spring members 39 are provided between each of the projections 37. The belts 35 are mounted on rotatable pulleys 41 at each side of the platen P. Referring to FIG. 5 wherein the mounting of the pulleys 41 is more clearly illustrated, it can be seen that the pulleys 41 are mounted on suitable shafts 43, one of the pulleys on each shaft, the left pulley as illustrated in FIG. 5, being permanently affixed to the shaft by means such as a set screw 45. The second pulley on the shaft is mounted for rotation with the shaft by suitable means such as internal splines (not shown). However, the second pulley is also mounted for movement axially on shaft 43 and is held in position by a suitable spring member 47 which, in cooperation with a snap ring 49 mounted in a groove (not shown) on shaft 43, provides means for spring loading the pulley to the right as illustrated to maintain the fanfold material taut therebetween and prevent sag therein. A second snap ring or retainer 51 is provided to prevent the right hand pulley 41 from being forced off shaft 43 when the fanfold material is disengaged from the feed belts 35. The driving side of the belts 35 in contact with the pulleys 41 may have a v-shaped projection 53 thereon for mating engagement with a groove 55 formed in pulleys 41 to prevent the belt 35 from slipping off pulleys 41.

Referring now to FIGS. 3 and 4, wherein the action of the canted projections 37 and springs 39 is more clearly illustrated, upon movement of the feed belts 35 to feed the fanfold material across the platen, the feed force necessary to move the fanfold material across the platen will cause the fanfold material to "ride up" the projections on belts 35 against the force of springs 39 to thereby assume the position illustrated in FIG. 3. This lifts the fanfold material from the platen glass, greatly reduces premature wear on the platen glass, prevents smudging of the document in the event the document is freshly printed, minimizes generation of static electricity which could be caused by the relative movement between the fanfold material and the platen glass, and reduces the feed force necessary for moving the fanfold material across the platen. Upon stoppage of the belts prior to copying the portion of the fanfold overlying the platen, the spring members 39 will force the fanfold material against the platen to ensure that the image areas on the fanfold material lie within the focal plane of the machine which ordinarily is the top surface of the platen glass. Upon start up of the feeder to advance the fanfold material, the material will again ride up the projections 37 on the feed belts and be lifted from the platen glass during slewing of the fanfold material across the platen.

While I have disclosed spring members 39 disposed between each of the projections 37 on the feed belts 35, it should be understood that stationary spring means could be mounted adjacent the belts to force the fanfold material against the platen upon stoppage of the feed belts. Again the stationary spring members would be selected to exert a minimal force on the fanfold material such that the material could ride up the projections 37 upon movement of the fanfold but be of sufficient force to press the fanfold material to the platen glass upon stoppage of the belts.

While the invention has been described with reference to the structure disclosed, it is not confined to the details set forth, but is intended to cover such modifications or changes as may come within the scope of the following claims.

What is claimed is:

1. A document handling apparatus for moving edge perforated document material across the exposure platen of a reproduction machine comprising:

a pair of movable feed belts disposed adjacent opposite sides of the exposure platen, said belts having a plurality of angled projections thereon formed of a low friction material for mating engagement with the perforations in perforated document material, movement of said belts causing the document material to slide up said angled projections on said belts to lift the material from the exposure platen; and biasing means adapted for cooperation with said feed belts to force the document material into contact with the exposure platen when said feed belts are stopped to enable exposure of the document material.

2. A document handling apparatus according to claim 1 wherein said biasing means comprises springs mounted on said belts between said projections to force the document material against the exposure platen when said belts are stopped.

3. A document handling apparatus according to claim 1 further including a pair of belt pulleys adapted for rotatably supporting each feed belt, the pair of pulleys supporting one of said belts being restrained against axial movement, the other pair of pulleys being biased in a axial direction away from the axially restrained pulleys to maintain the perforated document material retained on the projections of said belts in a taut condition.

* * * * *